United States Patent
Goshen et al.

(10) Patent No.: US 11,227,323 B2
(45) Date of Patent: Jan. 18, 2022

(54) SMART SOFTWARE RECOMMENDATION USING AN APPLICATION NETWORK

(71) Applicant: EMC IP Holding Company LLC, Hopkinton, MA (US)

(72) Inventors: Idan Richman Goshen, Beer Sheva (IL); Avitan Gefen, Tel Aviv (IL); Amihai Savir, Sansana (IL); Shiri Gaber, Beer Sheva (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 24 days.

(21) Appl. No.: 16/833,997

(22) Filed: Mar. 30, 2020

(65) Prior Publication Data

US 2021/0304281 A1    Sep. 30, 2021

(51) Int. Cl.
*G06Q 30/06* (2012.01)
*G06Q 30/02* (2012.01)

(52) U.S. Cl.
CPC ..... *G06Q 30/0631* (2013.01); *G06Q 30/0201* (2013.01)

(58) Field of Classification Search
CPC .............. G06Q 30/0631; G06Q 30/0201
See application file for complete search history.

(56) References Cited

U.S. PATENT DOCUMENTS

| | | | | |
|---|---|---|---|---|
| 8,468,164 B1* | 6/2013 | Paleja | ..................... | G06F 16/24 707/767 |
| 2012/0117558 A1* | 5/2012 | Futty | ......................... | G06F 8/61 717/176 |
| 2012/0239786 A1* | 9/2012 | Repasi | ................ | H04L 12/6418 709/219 |
| 2013/0185292 A1* | 7/2013 | Li | ......................... | G06F 21/562 707/723 |
| 2013/0198029 A1* | 8/2013 | Mowatt | .................... | G06F 8/60 705/26.7 |
| 2015/0294110 A1* | 10/2015 | Ogrinz | ................. | G06F 21/562 726/25 |
| 2016/0323173 A1* | 11/2016 | Bivens | .................... | H04L 43/14 |
| 2020/0057946 A1* | 2/2020 | Singaraju | .............. | G06N 5/041 |

* cited by examiner

*Primary Examiner* — Philip J Chea
*Assistant Examiner* — Hassan A Khan
(74) *Attorney, Agent, or Firm* — Workman Nydegger (57) ABSTRACT

Recommending applications is disclosed. An application graph is disclosed that represents applications. Each node of the graph corresponds to an application and edges relate applications that can handle the same file type. When an input application is identified, the graph can be used to recommend other applications that may be a suitable replacement for the input application. The recommendation is based on the graph and its links and on characteristics of the organization.

18 Claims, 3 Drawing Sheets

SMART SOFTWARE RECOMMENDATION USING AN APPLICATION NETWORK

FIELD OF THE INVENTION

Embodiments of the present invention generally relate to recommendation operations and recommendation engines. More particularly, at least some embodiments of the invention relate to systems, hardware, software, computer-readable media, and methods for recommending applications using an application network or graph and to recommending a substitute or replacement application for an application that is not currently available.

BACKGROUND

While computer hardware provides the power needed to perform processing, applications and data leverage the computing power of the hardware. While the importance of hardware cannot be discounted, the ability to perform work or use the hardware really depends on the application. Documents, for example, cannot be created without a word processing application. Videos cannot be edited without video editing software.

More specifically, a wide variety of applications are available for many different purposes. Employees of an organization often use a variety of applications in their daily work. In fact, many organizations spend a substantial amount of money on software. In addition to the cost of the software itself, organizations also realize that there are software related costs such as those incurred by employees that are unable to work due to the unavailability of the proper application.

Applications may be unavailable for many reasons. For example, the cost of an application or for additional licenses can be expensive and, for some organizations, is prohibitive. In addition to cost related concerns, organizations must also consider compatibility issues.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to application discovery and recommendation. More particularly, at least some embodiments of the invention relate to systems, hardware, software, computer-readable media, and methods for recommending software or applications to end users. Although embodiments of the invention are discussed with respect to recommending software or applications, embodiments of the invention may also be applied to other types of recommendations such as products, parts, drugs, or the like or combination thereof.

Embodiments of the invention relate to recommending an alternative application to users when a particular application is unavailable. A user may attempt to access or use an application, only to discover that the application is unavailable. Embodiments of the invention may automatically generate a recommendation based on the detected failure. Alternatively, the desired application may be input into a recommendation engine in order to discover a substitute application.

A recommendation engine may construct and maintain a graph or other representation of applications. The graph can be constructed such that the applications in the graph are associated by one or more characteristics, purpose, or the like. Thus, the edges may represent the characteristics and may be weighted. Relating applications by characteristics and/or purpose allows an alternative application to be recommended.

In addition to making recommendations based on at least one characteristic embodiments of the invention may incorporate other characteristics or factors that are not related to or are not directly related to the application. More specifically, application characteristics may include file types used by the application, purpose, and community. As discussed in more detail, community is a characteristic that is derived from the application graph being constructed. Organizational characteristics may include license availability, user feedback, and link prediction. The recommendation engine may incorporate or implement machine learning to improve recommendations over time and for predictive purposes.

The ability to recommend alternative applications may provide flexibility to an organization and/or end users, and can also provide a performance improvement that is reflected in decreased cost, improved user productivity and satisfaction, and shortened downtime.

For example, an organization may have licenses for several similar software applications. If the licenses for software A are being used and a user is unable to obtain a license, embodiments of the invention may be able to direct a user to software B, for which a license is available.

As previously discussed, a need for an alternative application may exist for several reasons (e.g., expensive licensing, organizational priority, no existing license, incompatibility, license not free (for floating licenses)). Embodiments of the invention, in order to recommend alternative applications, include a graph based recommendation engine that is configured to generate a network or graph of applications and/or generate recommendations. This process can be automated or user driven. A user may explicitly seek recommendations for alternative software. The computing system may also be configured to detect when an application is unavailable and automatically present the user with potential replacements or alternatives.

Once an application graph is constructed, the recommendation engine can search the graph based on input (or based on a detected state (e.g., a user cannot use or access a particular application)). When a user is unable to use an application, the name or other representation of the application can be provided as input to the recommendation engine. The recommendation engine can search the graph based on the input to recommend one or more alternative applications to the application that is presently unavailable.

In one example, the nodes of the graph represent applications (or software) and the edges between the nodes or applications may represent that the connected nodes or applications use the same or similar file types or formats. The edges may specify the file types and may be weighted. The weight of the edges may be used when recommending an alternative application or when scoring potential applications to recommend.

In addition, the graph may be analyzed to identify communities of similar applications. This allows a community-based search of the graph. In one example, a search that accounts for community allows recommended applications in the community to receive a higher score than recommended applications in a different community. In addition, user feedback or crowdsourced feedback can be used when generating a recommendation. For example, user scores can be associated with the applications and incorporated into the recommendations.

Using the graph, the information stored in the graph, community information, and feedback, embodiments of the invention are able to generate a recommended application to a user or to a group of users. For example, the user may desire to use a specific word processing application but does not have a license and the application is therefore unavailable. Searching the graph using the specific word processing application as input may result in a recommendation for a different word processing application that is available for use. If more than one application is recommended, the user may have the ability to select one of the recommendations. The user may also be able to view the feedback and/or other reasons for the recommendation made by the recommendation engine.

Figure 1:
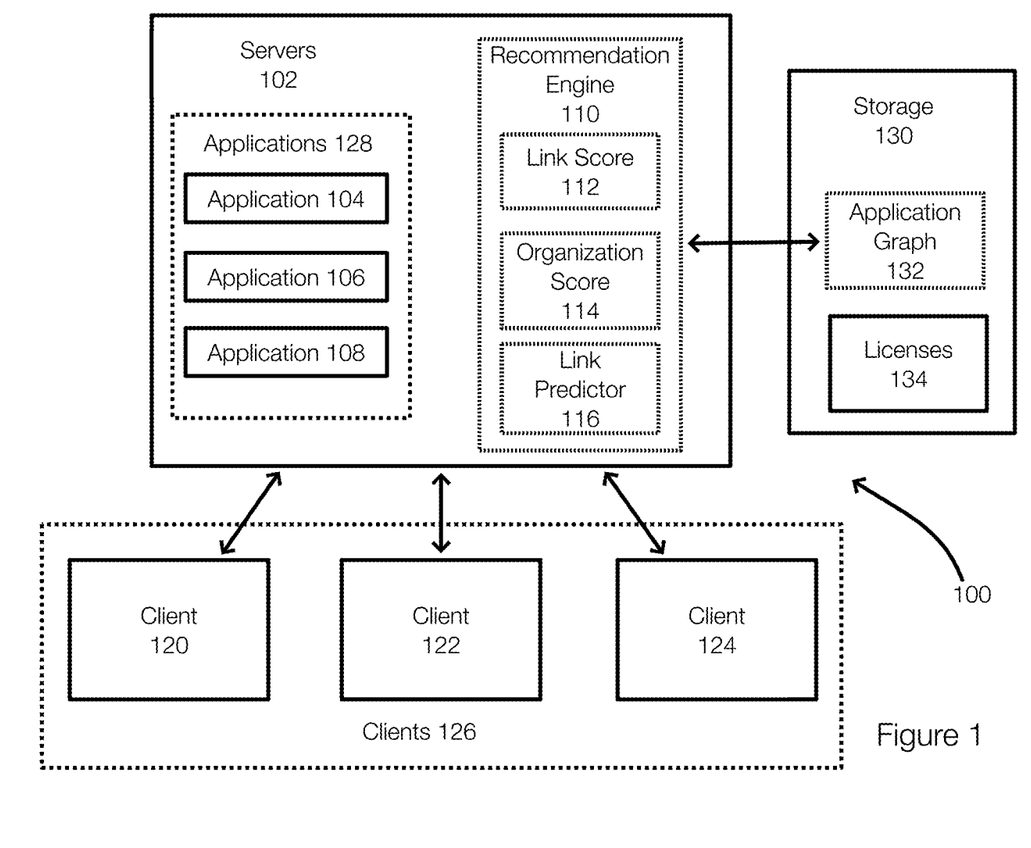
FIG. 1 discloses aspects of a computing system that includes applications available for use by clients.

FIG. 1 illustrates an example of a computing system that includes a recommendation engine configured to identify or recommend software or applications. In FIG. 1, the computing system 100 may represent a local area network, a wide area network, the Internet, cloud-based services and hardware, or the like or combination thereof.

The system 100 may include servers 102. The servers 102 may also include or represent services, containers, or virtual machines or the like and may run applications, provide storage, or the like. The system 100 is also used by or includes clients 126, which are represented by clients 120, 122, and 124. The client 126 may be end user devices such as computers, laptops, tablets, smartphones, or the like. The servers 102 may be on-premise, cloud-based, or combination thereof. In some examples, servers, services, or the like may also be clients.

The system 100 may also provide applications 128, which includes applications 104, 106, and 108. The applications 128 are illustrated as running on the servers 102. However, the applications 128 may be instantiated on the clients 126 and/or other locations in the computing system 100 and may be implemented in other manners such as containers, virtual machines, or the like. Applications can be deployed in the system 100 in a variety of different manners.

The clients 126 are networked to the servers 102 in this example. The servers 102, the applications 128, and/or the clients 126 are associated with or have access to storage 130, which may store data used by the clients 126 and/or the servers 102. The storage 130, for example, may store production data and may be cloud-based storage, on-premise storage, device based storage, or the like. The computing system 100 may also be associated with a data protection system.

The applications 128 are generally used by the clients 126 and the nature of the application may impact the location at which the application is running. For example, word processing applications can run on the clients directly and use data stored in the cloud or in a local network. Word processing applications can also be network or cloud based and run in the cloud.

The applications 128 may be associated with licenses 134. For example, an organization may have two floating licenses for the application 104, which is represented in the licenses 134. If the client 120 and the client 122 are both using a license, then the client 124 will not be able to use the application 104. The organization may not purchase a third license because of cost or for other reasons. Thus, the client 124 must wait for one of the licenses to become free before being able to use the application 104.

Embodiments of the invention, however, can resolve these issues and improve performance. FIG. 1 illustrates a recommendation engine 110 that is associated with or includes an application graph 132 stored in the storage 130 (or in another location). The recommendation engine 110 can, in this example, recommend an alternative application to the client 124 (or more specifically, to a user of the client 124) that the user can use and that can be executed in place of the application that is currently unavailable.

For example, the client 124 may present the recommendation engine 110 with the information about the application 104 that is not currently available for use such as its name, function, a supported file type, or the like. The recommendation engine 110 will search or use the graph 132 based on the input and generate a recommendation that is delivered to the client 124. The recommended application may be presented on a display for the user to view and select for example. Alternatively, the recommended application may automatically launch. In one example, the recommendation engine 110 may be able to detect that the application a user desires to use is unavailable, generate a recommendation and launch the recommended application without input from the user.

For example, if the application 104 is a first word processing application and the application 106 is a second word processing application that is different from the first word processing application, the recommendation engine 110 may recommend the application 106 to the client 124 when the application 104 is unavailable to the user. This allows the client 124 to begin work using the application 106. This can increase the user's satisfaction with the organization's computer system as a whole and with the applications that are available for use, and increase the user's productivity.

The recommendation engine 110 is configured to use the application graph 132 to generate a recommendation for an alternative application to the application that is presently unavailable. The recommendation engine may generate a score for applications in the graph and then generate a recommendation based on the scores.

In one example, the recommendation score may include or be generated from a link score 112 and an organization score 114. These scores may depend or be based on link strength, organizational match, and/or other factors or characteristics.

The link score 112, for example, may be based on the graph 132 itself. Thus, information available in or derived from the graph 132 such as communities, user reviews, and edge weights. The organization score 114 may be based on characteristics such as whether the alternative application is already deployed in the computing system 100, whether the alternative application is compatible with the relevant OS, and/or whether a license is available for the alternative application. The recommendation engine 110 may also adapt subsequent recommendations using machine learning techniques, new user feedback, link prediction models, or the like.

Figure 2:
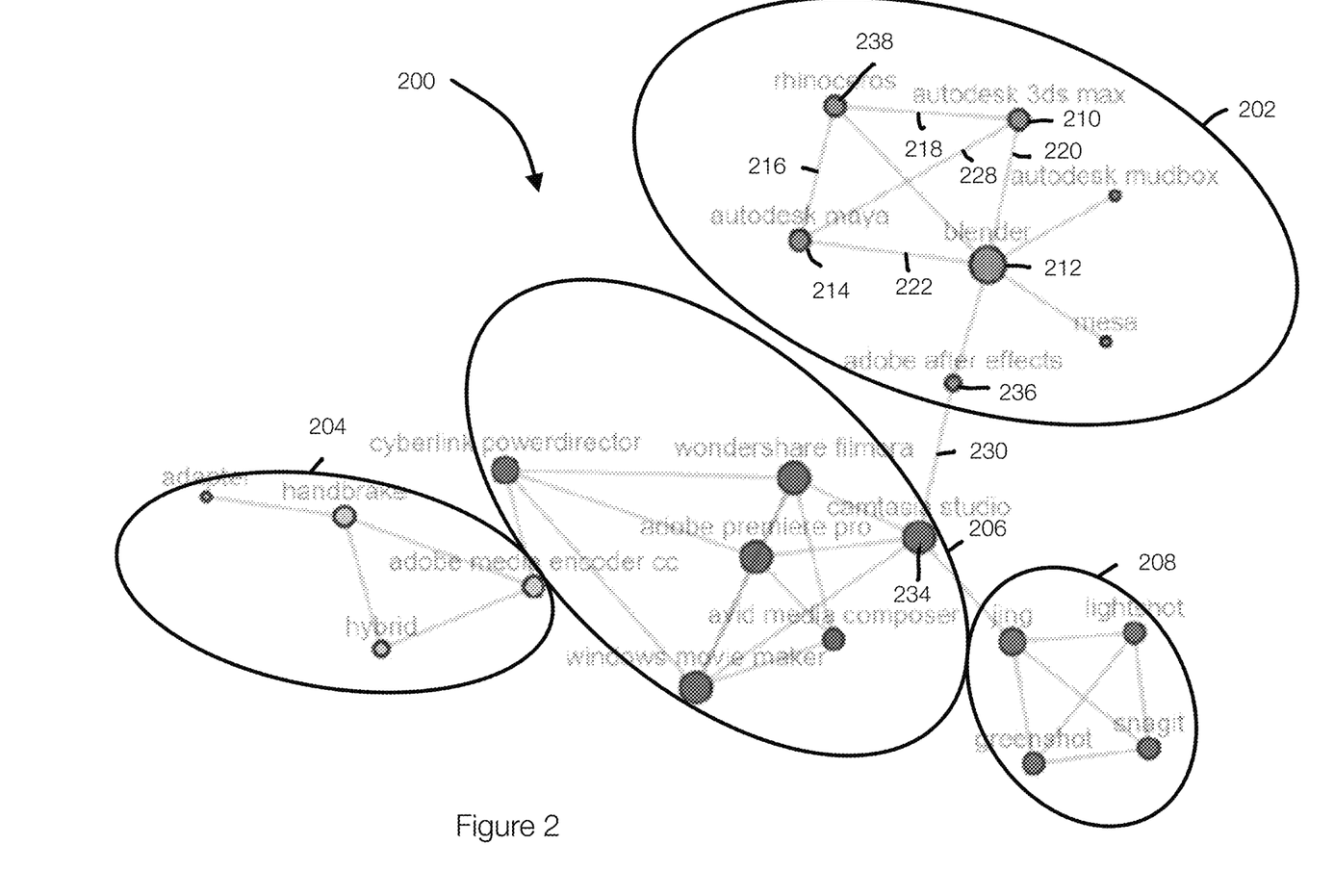
FIG. 2 discloses aspects of an application graph configured or used for generating application recommendations.

FIG. 2 illustrates an example of an application graph 200 that is used for generating recommendations for applications that can be used instead of an identified application or an input application. The graph 200 includes nodes and edges. For clarity, less than all of the nodes and edges shown in FIG. 2 are associated with a reference character.

In this example, the nodes of the graph 200 represent or correspond to applications and the edges represent file types shared by the connected nodes or applications. For example, the node 210 is connected to the nodes and 212 and 214 by, respectively, edges 220 and 228. The node 210 is connected to the node 238 by an edge 218. The nodes 214 and 238 are connected by the edge 216. Other edges are illustrated in FIG. 2.

Edges represent, in one example, that the connected nodes (which represent applications or software) share a factor or characteristic. For example, edges may represent file types that are common to connected nodes. In this example, the edge 220 represents that the node 210 and the node 212 share at least one file type or can process at least one file type. In other words, the applications represented by the nodes 210 and 212 can both process the file types represented by the edge 220. In one example, the edge 220 may be associated with all of the file types shared by the nodes 210 and 212. Similarly, the edge 228 represents the file types shared by the applications or nodes 210 and 214.

The edges may also be weighted. For example, the number of common file types may contribute to the weight. The number of edges connecting to a node may also contribute to the weight of the edges. The weights may be varied as the recommendation engine learns to generate better recommendations.

FIG. 2 also illustrates that the nodes or applications in the graph 200 may be grouped into communities. FIG. 2 illustrates communities 202, 204, 206 and 208. Each community includes at least one node. By way of example only, a community is a group of nodes that have a higher likelihood of connecting to each other than to nodes from other communities. In one example, applications that share or that are compatible with a specific file type may be grouped as a community. When generating recommendations, the recommendation engine may recommend an application from the same community rather than an application from another community. Stated differently, the generation of a link score may include a penalty when a node is from a different community. Different scoring techniques can be implemented.

In one example, the communities 202, 204, 206, and 208 are derived from the nodes and/or edges and/or other information about the applications. For example, a collection of connected nodes may be linked to another collection of connected nodes by a single edge. As illustrated in FIG. 2, this is one characteristic that may contribute to the identification of the communities 202 and 206. Other information about the nodes such as purpose may be used to identify and group communities. Applications whose purpose is video processing may be grouped (even if they do not all share a common file type). Further, the identification of communities can be updated through computer learning.

The arrangement of communities can also be a factor when recommending an application. However, this does not preclude nodes or applications from different communities from being recommended. The edge 230, for example, connects the node 236 and the node 234. The nodes 234 and 236 are part of different communities and, in this example, only share a single edge 230. The community 202 is linked to the community 206 by the edge 230. As a result, the node 236 could be recommended to a user when the node 234 is unavailable. However, because the node 236 is in a different community, the link score will reflect this relationship and is reflected in the link score.

Similar applications typically share the same community. In some cases, however, two applications may share the same file type but are intended for different purposes. As a result, these applications may be in different communities and be linked by an edge. Identifying communities in the graph 200 can aid in distinguishing these types of situations. The Louvain method is an example of a method for detecting communities in a network or graph. Additional community detection algorithms can be found at http://neo4j.com/docs/graph-algorithms/current/algorithms/community/, which is incorporated by reference in its entirety.

When building the graph 200, information about applications may be included in the graph 200. The information can be obtained from sources such as fileinfo.com, which is incorporated by reference in its entirety. Data about applications and their filetypes can be obtained from these open sources. The graph 200 can be constructed by adding nodes for applications and then adding edges to connect nodes that share filetypes. When two connected applications share multiple file types and by way of example only, the edge weight can be larger. In addition to connecting nodes by adding edges in the graph based on file type or other characteristics such as primary purpose, communities may also be identified in the graph 200 based on purpose or other characteristics.

For example, edge weights may be set based on file types, number of file types, how common or prevalent the file type is (e.g., a standard), or the like. In addition or in the alternative, edge weights can be set based on other factors such as the frequency of finding two applications in an online search, or based on how a search engine may auto-complete (e.g., Autodesk maya vs . . . ). Factors that show a relationship between two applications can be used to set edge weights or as edges themselves.

The edge weights can also be adapted based on learning. For example, if users repeatedly select the same replacement application, the corresponding edge weight may be increased or an edge may be created if not previously present. Further, this may also be used to reevaluate communities and the like.

The nodes may be associated with other information or metadata such as user feedback and this information may be used in generating scores and recommendations. The user feedback can be represented as a score and incorporated into the nodes. For example, if the node 214 is recommended to a user when the node 238 is unavailable and a user provides a rating of 9 out of 10, this information can be stored or associated with both the node 238 and the node 214. This data may be incorporated into the link score. Over time, the recommendations generated from the graph 200 are likely to improve. Further, this information may also be used in link prediction in order to generate new edges or relationships in the graph.

When an application name is input into the graph 200, the node corresponding to the input is identified and the graph 200 is searched for that node's closest neighbors with the strongest links. For example, a search for an application associated with the node 212 may consider nodes that are directly connected. Of course, embodiments of the invention may allow nodes that are more than one link away to be considered. Community mismatches may be penalized.

In addition, applications or nodes that have been upvoted by users may receive a higher score. For example, if the input application is the node 236, a score for the application corresponding to the node 234 may be penalized because the node 234 is in a different community 206. However, the node 234 may receive a higher score if the user feedback reflects that the node 234 is a great replacement for the node 236. This may also lead to adjustment of the community.

If the node 210 is recommended as a replacement for the node 236 and the user feedback is positive, the link prediction methods may establish a direct link between the nodes 210 and 236. The recommendation engine can learn and adapt the graph 200. Further, there may be instances when the information used in constructing the graph 200 is faulty, incomplete, or the like. The graph 200 is able to learn and correct these types of errors and inconsistencies over time.

By way of example only, the link score for an application being considered as a replacement for an input application may be denoted, by way of example only, by the following formula:

$$\text{Link Score}_{ij} = f(K_{ij}) - g(\text{CDist}_{ij}) + h(U_{ij}).$$

In this example, $K_{ij}$ represents an edge weight between node i (the user input application) and node j (the candidate application for recommendation). $\text{CDist}_{ij}$ represents a distance between communities of node i and node j. The distance can be calculated or determined using various methods. For example, when two communities are directly linked through the nodes, a score of 1 may be applied. A score of 2 may be applied when the two communities are not directly linked but share the same direct link with a third community. Nodes in the same community may receive a value of −1 to reverse the penalty. Communities without any shared connections will get a high value or a higher penalty.

$U_{ij}$ may represent a user's review score based on past suggested links between nodes i and j. This score can be between 0 and 1 or another value. Other scoring mechanisms are within the scope of embodiments of the invention.

The link quality can also be improved using link prediction. FIG. 1 illustrates that the recommendation engine 110 may include a link predictor 116, which may include machine learning algorithms that are configured to perform link prediction. Link prediction allows nodes that are not currently connected to be connected, allows current connections to be altered, and the like. In one example, an edge may be created between two applications that do not directly share file types but should be connected in purpose. For example, if node A is connected to node B and node B is connected to node C, link prediction may link node A to node C when node B is a replacement for node A and node C is a replacement for node B.

Alternatively, if users continually provide feedback that the node C is a great replacement for node A, the link predictor 116 may create a direct link between nodes A and C. The weight of the edge may depend on whether the nodes are in the same community, the purpose of the applications, and/or other information learned about the nodes or applications. In some examples, the communities to which nodes belong may be reevaluated by the link predictor 116 and, if necessary, reorganized based on, by way of example only, user feedback, information about the applications (e.g., purpose, updates to the applications, or the like).

Figure 3:
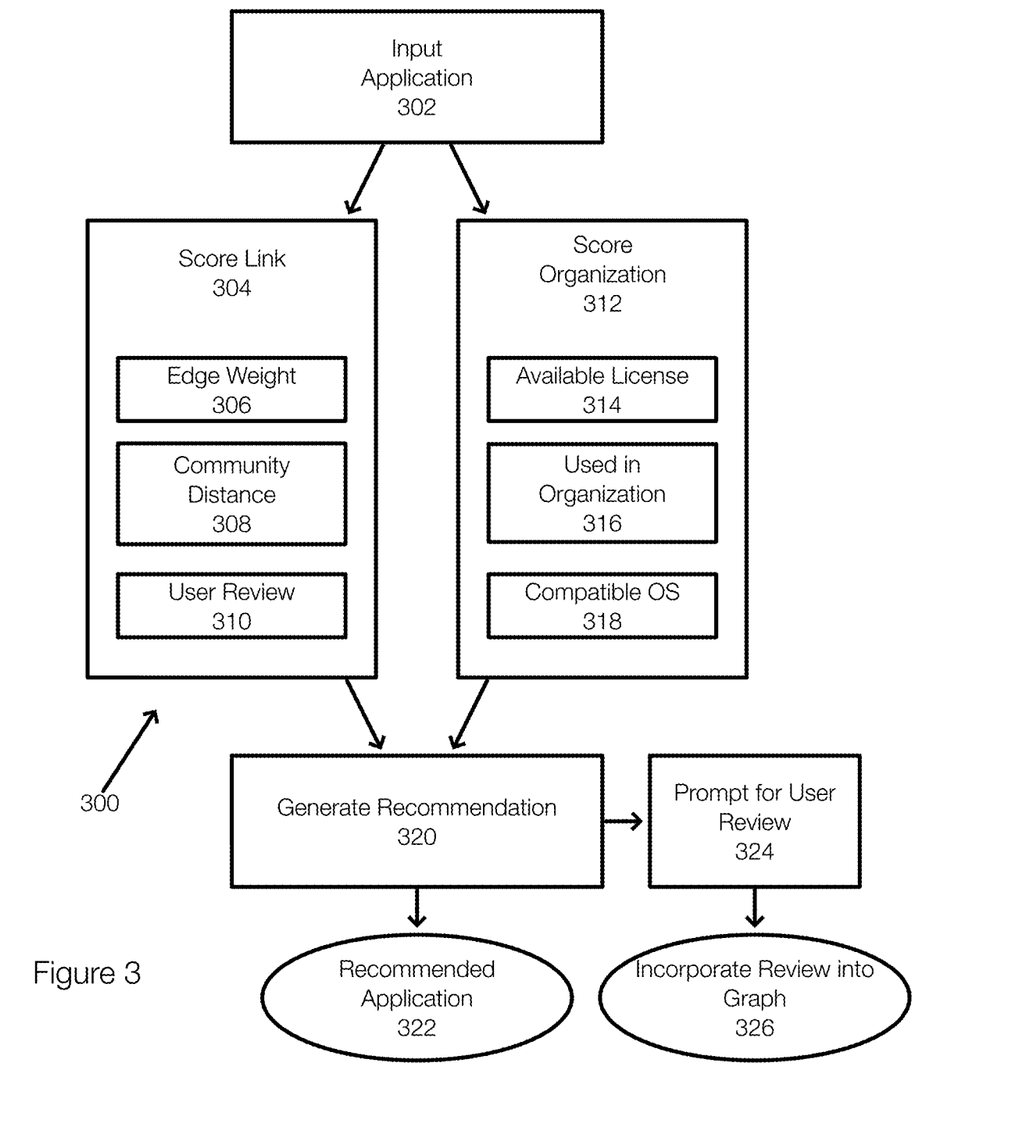
FIG. 3 is an example of a method for generating recommendations.

FIG. 3 illustrates an example of a method for recommending an application. More specifically, the method 300 may generate a recommendation that identifies an application a user may use in place of another application that is unavailable to the user. In addition, however, the graph could also be used to generate recommendations in general. For example, a user may want to know which applications are available for certain file types or for certain purposes. This information could be input into the graph and the user may be provided with a list of applications that could be used. The user may be able to use the applications that are supported by the organization.

In the method 300, an application is input 302 to an application graph. In one example, the application graph may have been previously constructed. However, the graph may also be updated or constructed when the input is received or at other times. Once the input is received, the graph is searched based on the input. In one example, the input corresponds to an application or a characteristic of an application. The input may be a name of the application. Because each application is represented by a node, the input corresponds to a node in the application. The node corresponding to the input application is identified and links can be evaluated from that node.

With reference to FIGS. 2 and 3, the input into the graph or used to search the graph 200 may be or may correspond to the node 212. A score may be generated for each of the other nodes included in the graph 200. In other embodiments, some nodes may be excluded from consideration based on distance, community or other factors. For example nodes more than one community away may be excluded.

In this example, searching the graph includes scoring 304 a link to and scoring 312 the organization. Scoring a link in one example, corresponds to scoring the link between the node and a candidate node. Scoring 304 the link may include determining or accounting for 306 an edge weight, distance (e.g., one edge or multiple edges), determining or accounting for 308 a community distance, and determining or accounting 310 for user reviews. These factors, by way of example only, may result in a link score for each of the nodes in the graph 200. This allows the nodes to be ranked in one example based on link score.

Scoring 312 the organization may include determining or accounting for 314 an available license, determining or accounting for whether the candidate application is used and/or installed 316 in the organization, and determining or accounting for computing factors such as whether the application is compatible 318 with the operating Some of the organizational considerations may be determinative. For example, if the organization does not have a license for the candidate software, this may exclude the application from being recommended regardless of the link score. Whether the application is used in the organization can relate to ease of use. For example, it may be easier to use an application that is already installed rather than wait for the application to be installed. If the application is not compatible with the OS or for other reasons, this may also exclude the application from consideration.

In one example, the scores associated with an available license and with a compatible OS may be 1 or 0. The score associated with use in the organization may be 1 (yes) 2 (yes and installed) or the like. The link score may be determined as previously discussed. In addition, some characteristics such as user reviews may be visually presented to the user for consideration in addition to being used in computing the user review portion of the link score.

Next, the link score and the organization scores may be combined to generate 320 a recommendation. These scores may be combined by sum, by weighted combination, multiplication, or the like or combination thereof. For example, the link score may count more than the organization score. The recommendation may include a single application with the best overall score, a list of ranked applications, or the like. The user may then select 322 the recommended application. The application may be automatically launched (or installed, etc.) when selected. Alternatively, the best recommendation may be automatically launched.

At some point, the user may be prompted 324 for a review of the recommended application (e.g., when the user exits the application or at another time). This review may be included or incorporated into the graph 200 and used in generating or updating the user review 310 portion of the link score.

Embodiments of the invention provide application or software recommendations in an automated manner. This allows for constant online learning and improvement, with minimal human intervention. Further, the recommendations may change based on real-time availability of user licenses. As licenses are acquired and released, this aspect is incorporated into the available license 314 aspect of the organization score 312.

Embodiments of the invention further reduce downtime associated with waiting for a license and reduce the overhead associated with unnecessary procurement processes. This allows organizations to balance licensing costs with downtime. Further unnecessary software purchases can be avoided when there an alternative application is already available.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, recommendation operations. These operations, while discussed in the context or recommending applications, may also relate to the recommendation of other resources and can be applied to multiple situations. For example, embodiments of the invention could be used to generate a replacement part for a vehicle or device when a desired part is not available. Embodiments of the invention may recommend a drug, or store, or other need when a particular drug or store is not available. More generally, the scope of the invention embraces any operating environment in which the disclosed concepts may be useful.

Embodiments of the invention may be deployed in new installs and work automatically to generate recommendations for applications when it is determined that the application a user is trying to use is unavailable. Information for the graph can be automatically obtained and updated from predetermined sources. New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, containers, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method, comprising inputting an application into a graph associated with a recommendation engine, wherein the input application is associated with a first node and wherein the graph is associated with nodes, the nodes including the first node and second nodes, determining a link score for the second nodes in the graph linked to the first node, determining an organization score for each the second nodes in the graph, wherein the link score is combined with the organization score to determine an overall score for each of the second nodes, and recommending at least one of the second nodes, wherein each of the second nodes corresponds to a different application.

Embodiment 2. The method of embodiment 1, wherein the graph comprises edges that connect the nodes, wherein each of the edges includes a weight and wherein edges represent whether the corresponding nodes share at least one characteristic.

Embodiment 3. The method of embodiment 1 and/or 2, wherein the at least one characteristic includes file type.

Embodiment 4. The method of embodiment 1, 2 and/or 3, wherein the graph comprises communities of nodes, wherein the communities of nodes identify applications that share a purpose.

Embodiment 5. The method of embodiment 1, 2, 3 and/or 4, wherein the link score accounts for edge weights, community distance, and user reviews.

Embodiment 6. The method of embodiment 1, 2, 3, 4 and/or 5, wherein the link score includes Link Score$_{ij}$=f(K$_{ij}$)−g(CDist$_{ij}$)+h(U$_{ij}$).

Embodiment 7. The method of embodiment 1, 2, 3, 4, 5 and/or 6, wherein the organization score is determined by accounting for license availability, use in an organization, and compatibility with operating system.

Embodiment 8. The method of embodiment 1, 2, 3, 4, 5, 6, and/or 7, further comprising prompting a user for a review of the recommendation.

Embodiment 9. The method of embodiment 1, 2, 3, 4, 5, 6, 7 and/or 8, further comprising performing link prediction to generate new edges between nodes in the graph.

Embodiment 10. The method of embodiment 1, 2, 3, 4, 5, 6, 7, 8, and/or 9, further comprising recommending at least one of the second nodes without user interaction.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 12.

Embodiment 13. Any portions of any one or more of embodiments 1-13.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and the disclosure and/or elsewhere herein, may take the form of, or include, or be implemented on, or hosted by, a physical computing device, one example of which is denoted at. As well, where any of the aforementioned elements comprise or consist of a virtual machine (VM), that VM may constitute a virtualization of any combination of the physical components disclosed herein.

In one example, the physical computing device includes a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    inputting an application into a graph associated with a recommendation engine, wherein the input application is associated with a first node and wherein the graph is associated with nodes, the nodes including the first node and second nodes;
    determining a link score for the second nodes in the graph linked to the first node;
    determining an organization score for an organization for each of the second nodes in the graph, wherein the organization score is based on whether applications corresponding to the second nodes are already deployed in a computing system for the organization or whether licenses for applications corresponding to the second nodes have been acquired by the organization, wherein the link score is combined with the organization score to determine an overall score for each of the second nodes, wherein the organization score is determined by accounting for license availability, use in an organization, and compatibility with operating system; and
    recommending at least one of the second nodes for use on the computing system, wherein each of the second nodes corresponds to a different application.

2. The method of claim 1, further wherein the graph comprises edges that connect the nodes, wherein each of the edges includes a weight and wherein edges represent whether the corresponding nodes share at least one characteristic.

3. The method of claim 2, wherein the at least one characteristic includes file type.

4. The method of claim 2, wherein the graph comprises communities of nodes, wherein the communities of nodes identify applications that share a purpose.

5. The method of claim 1, wherein the link score accounts for edge weights, community distance, and user reviews.

6. The method of claim 5, wherein the link score includes Link Score$_{ij}$=f(K$_{ij}$)−g(CDist$_{ij}$)+h(U$_{ij}$).

7. The method of claim 1, further comprising prompting a user for a review of the recommendation.

8. The method of claim 1, further comprising performing link prediction to generate new edges between nodes in the graph.

9. The method of claim 1, further comprising recommending at least one of the second nodes without user interaction.

10. A non-transitory storage medium having stored therein instructions that are executable by one or more hardware processors to perform operations comprising:
    inputting an application into a graph associated with a recommendation engine, wherein the input application is associated with a first node and wherein the graph is associated with nodes, the nodes including the first node and second nodes;
    determining a link score for the second nodes in the graph linked to the first node;
    determining an organization score for an organization for each of the second nodes in the graph, wherein the organization score is based on whether applications corresponding to the second nodes are already deployed in a computing system for the organization or whether licenses for applications corresponding to the second nodes have been acquired by the organization, wherein the link score is combined with the organization score to determine an overall score for each of the second nodes, wherein the organization score is determined by accounting for license availability, use in an organization, and compatibility with operating system; and
    recommending at least one of the second nodes for use on the computing system, wherein each of the second nodes corresponds to a different application.

11. The non-transitory storage medium of claim 10, wherein the graph comprises edges that connect the nodes, wherein each of the edges includes a weight and wherein edges represent whether the corresponding nodes share at least one characteristic.

12. The non-transitory storage medium of claim 11, wherein the at least one characteristic includes file type.

13. The non-transitory storage medium of claim 11, wherein the graph comprises communities of nodes, wherein the communities of nodes identify applications that share a purpose.

14. The non-transitory storage medium of claim 10, wherein the link score accounts for edge weights, community distance, and user reviews.

15. The non-transitory storage medium of claim 14, wherein the link score includes Link $Score_{ij}=f(K_{ij})-g(CDist_{ij})+h(U_{ij})$.

16. The non-transitory storage medium of claim 10, further comprising prompting a user for a review of the recommendation.

17. The non-transitory storage medium of claim 10, further comprising performing link prediction to generate new edges between nodes in the graph.

18. The non-transitory storage medium of claim 10, further comprising recommending at least one of the second nodes without user interaction.

* * * * *